United States Patent [19]

Hähn et al.

[11] Patent Number: 4,662,936
[45] Date of Patent: May 5, 1987

[54] METHOD OF TREATING NICKEL-CONTAINING AND VANADIUM-CONTAINING RESIDUES

[75] Inventors: Reinhard Hähn, Schwabach-Limbach; Hans Hess; Siegfried Sattelberger, both of Nuremberg, all of Fed. Rep. of Germany

[73] Assignee: GfE Gesellschaft fur Elektrometallurgie mbH, Dusseldorf, Fed. Rep. of Germany

[21] Appl. No.: 692,040

[22] Filed: Jan. 16, 1985

[30] Foreign Application Priority Data

Jan. 25, 1984 [DE] Fed. Rep. of Germany ....... 3402356

[51] Int. Cl.$^4$ .............................................. C22B 4/04
[52] U.S. Cl. ...................................... 75/10.54; 75/82; 75/97 R; 423/68
[58] Field of Search .................... 75/82, 62, 24, 10.54, 75/97 R; 423/62, 68

[56] References Cited

U.S. PATENT DOCUMENTS

| | | | |
|---|---|---|---|
| 3,753,681 | 8/1973 | Vojkovic | 75/24 |
| 3,929,460 | 12/1975 | Peters et al. | 75/24 |
| 3,996,045 | 12/1976 | Ishii | 75/82 |
| 4,029,495 | 6/1977 | Hirayama | 75/82 |
| 4,280,839 | 7/1981 | Tolley et al. | 75/82 |

OTHER PUBLICATIONS

Stemerowicz et al, *CIM Bulletin,* Apr. 1976, pp. 102–108.

*Primary Examiner*—Melvyn J. Andrews
*Attorney, Agent, or Firm*—Karl F. Ross; Herbert Dubno

[57] ABSTRACT

Nickel- and vanadium-containing catalysts or petroleum treatment of combustion residues are combined with alkali metal carbonates and/or chlorides and the resulting mixture is melted in the presence of a sulfur carrier with or without carbon which serves to reduce the sulfur to a sulfidic form, a high vanadium, low nickel slag seggregating from a high nickel, low vanadium matte. The matte and slag can be separately tapped and the melt is treated metallurgically to recover nickel while the slag is leached and is thus treated hydrochemically to recover valuable vanadium compounds.

1 Claim, No Drawings

METHOD OF TREATING NICKEL-CONTAINING AND VANADIUM-CONTAINING RESIDUES

CROSS REFERENCE TO RELATED APPLICATION

This application is related to our commonly assigned copending application Ser. No. 692,022, filed concurrently herewith, based upon German application No. P 34 02 357.7 of 25 Jan. 1984.

FIELD OF THE INVENTION

Our present invention relates to a method of recovering nickel and vanadium from nickel-containing and vanadium-containing solid and especially to a method of treating nickel-containing and vanadium-containing residues of petroleum so as to enable the recovery of nickel and vanadium therefrom in useful form.

BACKGROUND OF THE INVENTION

Petroleum residues, i.e. solid residues from the processing of petroleum, which can be formed during the petroleum-processing operation or upon combustion, and which can contain comparatively large quantities of vanadium and nickel at least in part resulting from the presence of vanadium and nickel in petroleum-processing particles.

It has been proposed to comminute such residues and combine the comminuted residues with alkali compounds and to roast the resulting mixture in an oxidizing atmosphere in a roasting furnace to obtain a solid composition which could be leached or extracted with water. The vanadium and nickel could be recovered from the resulting solution.

Generally the residues in question arise from their treatment and utilization of vanadium- and nickel-containing crude oils and petroleum products in coking, hydrodemetallization, cracking, gasification and combustion.

Such residues can contain 10 to 60% by weight $V_2O_5$ and 3 to 15% by weight Ni apart from similar but conventionally present amounts of Mg, C, Si, Ca and S. Vanadium- and nickel-containing catalysts are generally required for the production of fats and waxes, for the hardening of fats by hydrogenation and in heavy oil processing.

The roasting which has been described does not yield products permitting differentiated processing to recover nickel compounds on the one hand and vanadium compounds on the other. In general, therefore, compounds of both vanadium and nickel are recovered together and separation poses a problem if it is necessary.

Because there have been only limited ways in which these residues could be processed economically and to obtain valuable components therefrom, it has generally been less expensive or more cost effective to dispose of the residues in landfills, rather than attempt to recover either the nickel or the vanadium therefrom.

In more general terms, it may be noted that the art has recognized a number of processes for the processing of nickel-containing and vanadium-containing materials but that these have seldom found their way into large scale use in practice. One proposal subjects the material to a reduction of vanadium oxide in an electric furnace for the production of ferro vanadium. Because of the high content of sulfur, carbon, nickel and silicon in such materials, the ferro vanadium which is produced is treated as second grade and thus has limited utility. It has also been proposed to subject the entire mass to a reducing operation which is followed by separation of vanadium by precipitation or extraction. We are not aware of commercial utilization of this procedure.

The use of alkali roasting as a means of treating petroleum residues, like proposed acid treatment, has also been found to be of limited utility and usually has been believed to be desirable only in association with nickel-free slags, because a high nickel content of the roasted material detrimentally affects waste water treatment, i.e. the treatment of waste water formed in the process which cannot be discharged because of the heavy metal content into the environment.

OBJECTS OF THE INVENTION

Our principal object, with this invention, is to provide a process for treating nickel-containing and vanadium containing solid residues, especially petroleum residues as the treatable substrate, such that nickel and vanadium products are obtained directly, i.e. separate treatment of nickel and vanadium containing intermediates can be avoided.

Another object of this invention is to reduce the possibility of environmental pollution which is brought into systems in which such residues are disposed in landfills and the like.

Still another object of our invention is to provide a more efficient method of recovering valuable vanadium and nickel in especially usable forms, from such residues.

DESCRIPTION OF THE INVENTION

These objects and others which will become apparent hereinafter are attained, in accordance with our invention, with a method or process whereby the vanadium- and nickel-containing solid residues, in a divided or comminuted form, are mixed with superstoichiometric amounts of alkali carbonates and/or alkali chlorides (generally the alkali metal carbonates or chlorides and preferably sodium carbonate and/or sodium chloride), the mixture being brought to a temperature above its melting point and then thereafter the resulting melt material is transformed with a sulfur carrier in sufficient quantities into a low-vanadium nickel matte and a low-nickel vanadium slag, the nickel matte and the vanadium slag being then separated mechanically and subjected to separate treatment in which the nickel and vanadium can be recovered in usable form, i.e. as compounds of desirable metal.

The reference to "superstoichiometric amount" of the alkali metal carbonates and/or alkali metal chlorides is a reference to a quantity in excess of that required to stoichiometrically bind the nickel and vanadium in water-soluble form.

The sulfur which participates in the metal-forming reaction can be sulfur which is present in the residue or which is added thereto and indeed may be sulfur which may be extracted from petroleum residues or may be present therein.

If the sulfur present in the residue does not meet the stoichiometric requirements for metal formation, we can add additional sulfur to the mixture before the heating step. In the latter case, the sulfur is added in its sulfidic form. Naturally, the sulfur can be added after heating begins but before the melt is formed or to the melt itself.

We have found it to be advantageous to produce the sulfur required for the melt formation in situ. In this case, the mixture of the comminuted residue and the alkali carbonate and/or alkali chloride is combined in addition with nonsulfidic sulfur carriers and a quantity of carbon so that when heating occurs subsequently with these materials being added or by the heat of the melt, the carbon will react with the sulfur carriers to liberate the sulfur which participates in the melt-forming reaction.

The melting is preferably effected in an electric arc furnace which is used as the melting apparatus. However, other types of furnaces may be used, for example a short drum furnace. The molten vanadium slag and the molten nickel matte are drawn separately from the furnace.

The mechanical preparation of the residue in the form of a comminuted product can utilize the fact that the residue may be available in a divided form, e.g. as a fly ash, but generally will require some form of mechanical subdivision to place it in the optimal state for mixing and, ultimately, for the smelting operation. The best results are obtained with a residue in the particle size range from 0.1 mm to about 20 mm and preferably between 0.5 mm and 20 mm with most effective results being obtained where the particle size is less than 10 mm.

The smelting of this residue with superstoichiometric amounts of alkali carbonate and/or chlorides in the presence of sulfur carriers, either in the form of sulfur carriers intrinsic to the residue or as an additive, appears to enable the immediate formation of a nickel matte from the nickel which may be present in the residue while the vanadium separates in the form of a slag floating upon the nickel matte.

When the sulfur-containing additive is nonsulfidic sulfur, it is necessary to supply as well a quantity of carbon at least sufficient to chemically transform the sulfur into its sulfide state. The carbon can be added in the form of anthracite coal or coke with an appropriate particle size, i.e. a particle size range as presented above.

It may be found to be advantageous, in accordance with the invention, to supply at least some carbon even when the residue itself contains sulfur which is in non-sulfidic form, if the residue does not contain a sufficient amount of reducing components.

Some of the residues which are to be processed in accordance with the invention will, however, contain large amounts of sulfur and carbonaceous materials in amounts sufficient to satisfy the reducing requirements.

Indeed, we may even mix petroleum residues which are rich in sulfur as well as petroleum residues rich in carbonaceous materials with residues rich in vanadium and nickel to form the mixture previously described.

When the nickel content of the residues is comparatively low, it may be advantageous to add to the melt a collector for nickel matte.

The particular melting point of the mixture need not be determined to be satisfactory simply to raise the temperature until melting occurs. Any convenient melting apparatus can be used for this purpose if, as we have noted, the preferred apparatus is either an electric furnace of conventional design or a short drum furnace.

The separation of the vanadium-containing slag from the nickel matte can be effected in one of several ways. For example, we can simply tap the nickel matte from beneath the vanadium-containing slag and then treat the slag with atmospheric oxygen or other oxygen carriers, such as sodium nitrate. Alternatively, we can draw off the nickel matte and the vanadium-containing slag together and effect the separation after hardening or during hardening.

Preferably, however, a third alternative is used wherein the nickel matte is permitted to remain in the furnace for several charges to accumulate while the slag is tapped or decanted after each charge. When the residue has little nickel, this allows nickel matte to accumulate in the furnace until it can be removed, e.g. by permitting it to cool within the furnace and removing it as a block.

The vanadium-containing slag can, if necessary, by oxidized further in another apparatus, e.g. a ladle, the oxidation being effected with air lances or by the addition of chemical substances such as sodium nitrate. The vanadium-containing slag and the nickel matte can both be worked up to recover nickel and vanadium in useful forms, in particular vanadium compounds which have been recovered by leaching the slag with water or water-containing sodium carbonates in the manner described in the aforementioned copending application by any of the methods described therein for the treatment of the melt materials. The nickel matte can be worked up by any conventional metallurgical method for the recovery of nickel or its compounds.

Specific Examples

EXAMPLE 1

1 kg of a mixture of carbon and sulfur rich vanadium- and nickel-containing combustion residues of the following composition:

V 16.40%
Ca 1.80%
Mg 7.15%
Ni 5.45%
C 1.84%
S 3.80% is combined with 300 g sodium carbonate in a comminuted form and is heated to a temperature about 900° C. in a laboratory melting furnace to produce a low viscosity melt which was then hardened and broken up to determine the content of the nickel matte and vanadium slag phases. The following analysis was obtained:

|   | Vanadium slag | Nickel matte |
| --- | --- | --- |
| V | 10.40% | 0.015% |
| Ni | 1.53% | 53.3% |
| S | n.b. | 18.0% |
| C | 0.2% | n.b. |

(n.b. = not significant)

In the foregoing analysis of the slag and matte, the balance at 100% was volatized such as oxygen and nitrogen in the form of compounds chemically bonded or substances which are not relevant to the results obtained.

In the vanadium slag the vanadium was present was water-soluble compounds representing 81.6% recovery from the original residue, the nickel recovery in the matte was 61.3%.

EXAMPLE 2

A 30 kg vanadium/nickel petroleum residue having the following analysis:
V 23.4%

Ni 4.1%
S 0.4%
C 1.2% is mixed with 13.5 g sodium carbonate and 6 kg of Na$_2$SO$_4$ and 1.8 kg of anthracite coal and melted in a short drum furnace at about 950° C.

To collect the relatively small amount of nickel matte, 300 g of metallic lead are added. After cooling and comminuting the slag and nickel matte phase were analyzed with the following results:

|    | Vanadium slag | Nickel matte |
|----|---------------|--------------|
| V  | 15.18%        | 0.01%        |
| Ni | 1.7%          | 49.7%        |
| Pb | 0.01%         | 23.8%        |
| S  | n.b.          | 23.5.%       |

The water-soluble vanadium amounted to 84.3% recovery and the nickel recovery was 44.7%.

EXAMPLE 3

30 kg of vanadium- and nickel-containing petroleum residues with the following analysis:
V 28.85%
Ni 11.6%
S 1.5%
C 0.69% was mixed with 13.5 kg soda, 6 kg Na$_2$SO$_4$ and 1.8 kg anthracite coal. The mixture was melted at about 850° C. in a short drum furnace. The analysis of the molten product in terms of the slag and nickel matte gave the following results:

|    | Vanadium slag | Nickel matte |
|----|---------------|--------------|
| V  | 23.16%        | 0.01%        |
| Ni | 0.31%         | 73.6%        |
| S  | n.b.          | 21.3.%       |

The water-soluble vanadium amounted to 91.2% recovery and the nickel recovery was about 96.4%.

EXAMPLE 4

10 kg of vanadium- and nickel-containing petroleum residues with the following analysis:
V 28.85%
Ni 11.6%
S 1.5%
C 0.69% was combined with 4 kg soda, 2 kg Na$_2$SO$_4$ and 0.6 kg anthracite coal, the solids having a particle size of about 0.5 to 2 mm. The mixture was melted in an electric furnace at 900° C. and the analysis of the hardened slag and nickel matte gave the following results:

|    | Vanadium slag | Nickel matte |
|----|---------------|--------------|
| V  | 23.37%        | 0.01%        |
| Ni | 0.43%         | 66.1%        |
| S  | n.b.          | 25.3.%       |

The water-soluble vanadium recovery was 84.3% and the nickel recovery 95.0%.

EXAMPLE 5

10 kg of vanadium- and nickel-containing petroleum residues with the following analysis:
V 28.85%
Ni 11.6%
S 1.5%
C 0.69% was combined with 4. kg soda, 1.0 kg pyrite (FeS$_2$) and 0.6 kg anthracite coal. The mixture is smelted at 950° C. in an electric furnace. The analysis of the slag and the nickel matte gave the following results:

|    | Vanadium slag | Nickel matte |
|----|---------------|--------------|
| V  | 24.14%        | 0.01%        |
| Ni | 2.03%         | 70.3%        |
| S  | —             | 23.2.%       |

The water-soluble vanadium yield was 87.3% and the nickel recovery was 85.0%.

EXAMPLE 6

5000 kg of vanadium- and nickel-containing petroleum residues with the following analysis:
V 28.85%
Ni 11.6%
S 1.5%
C 0.69% was mixed with 2250 kg soda, 1000 kg Na$_2$SO$_4$ and 300 kg anthracite coal in a short drum at 950° C. After tapping of the nickel matte which was processed from the slag and the nickel matte which was processed metallurgically with retention of the slag, further reduction occurred in the slag which was found to be advantageous for the subsequent leaching and chemical recovery of the vanadium compounds by the method described in the aforementioned application. The slag was subjected to oxidation with air within the furnace for a period of two hours to eliminate the reducing effect of the slag. The following data apply:

| Time | Oxidation Value* |
|------|------------------|
| Tapping of Nickel Matte | 3.6 |
| + 1 h | 1.6 |
| + 2 h | 0.57 |

*empirically determined measure of the amount of oxidizing agents required for the reducing power of the slag.

In all of the foregoing Examples, the substitution of sodium chloride for the sodium carbonate in whole or in part gave similar results, except that the melting temperatures were higher when sodium carbonate was completely replaced by sodium chloride. In place of the petroleum residues described, spent V/Ni catalysts could be used.

We claim:

1. A process for treating a petroleum residue from the combustion or treatment of petroleum and which contains vanadium and nickel, said process comprising the steps of:
   mixing said petroleum residue in a particle size of 0.1 to 20 mm with a superstoichiometric amount of an alkali carbonate and pyrite as a sulfur carrier;
   smelting the mixture in an electric furnace to form nickel matte and a slag;
   separately tapping said slag and said matte from said furnace whereby said slag is virtually free from nickel and said matte is virtually free from vanadium;
   recovering nickel from said matte; and
   treating said slag with water to recover the vanadium of said slag in the water in the form of water-soluble vanadium.

* * * * *